United States Patent [19]

Spease

[11] Patent Number: 5,337,621
[45] Date of Patent: Aug. 16, 1994

[54] CABLE END FITTING RETAINER AND METHOD FOR MAKING SAME

[75] Inventor: David T. Spease, Van Wert, Ohio

[73] Assignee: Teleflex Incorporated, Limerick, Pa.

[21] Appl. No.: 154,288

[22] Filed: Nov. 18, 1993

[51] Int. Cl.⁵ .............................................. F16C 1/10
[52] U.S. Cl. .................... 74/502.4; 264/275; 74/502.6; 74/500.5; 285/231; 403/267
[58] Field of Search ... 74/500.5, 501.5 R, 502.3–502.6; 285/291, 149; 403/267; 264/275; 29/527.5

[56] References Cited

U.S. PATENT DOCUMENTS

| | | | |
|---|---|---|---|
| 2,111,107 | 3/1938 | Walde | 403/267 |
| 2,484,485 | 10/1949 | Brickman | 237/80 |
| 3,263,519 | 8/1966 | Conrad | 74/501 |
| 3,263,520 | 8/1966 | Tschanz | 74/501 |
| 3,422,592 | 1/1969 | Gjerde | 403/267 |
| 3,573,346 | 4/1971 | Appleby | 403/267 |
| 3,660,887 | 5/1972 | Davis | 403/267 |
| 3,844,665 | 10/1974 | Smith et al. | 74/502.6 |
| 4,027,130 | 5/1977 | Filip | 74/502.6 |
| 4,184,784 | 1/1980 | Killian | 403/267 |
| 4,342,982 | 8/1982 | Plasko | 403/267 X |
| 4,718,788 | 1/1988 | Briscoe | 74/502.6 X |
| 5,018,251 | 5/1991 | Brown | 74/502.6 X |
| 5,027,497 | 7/1991 | Takaki et al. | 29/527.5 |
| 5,199,320 | 4/1993 | Spease et al. | 74/502.4 |

FOREIGN PATENT DOCUMENTS

0514771  11/1938  United Kingdom .............. 74/502.6

*Primary Examiner*—Vinh T. Luong
*Attorney, Agent, or Firm*—Reising, Ethington, Barnard, Perry & Milton

[57] ABSTRACT

A motion transmitting remote control cable assembly (10) includes a flexible remote control core element (12) and a conduit (14) which slideably supports the core element. The conduit (14) has a jacket (16) defining an outer surface and an inner bore. A liner (18) lines the inner bore and includes a protruding end protruding from an end of the jacket. The conduit (14) also includes a plurality of lay wires (20) having ends protruding from an end of the jacket (16) together with the liner (18). The ends of the lay wires (20) are formed to have an arch-shaped protrusion (22,26) which protrudes radially from the end of the liner (18). Such a protrusion (22,26) forms a mechanical lock between the conduit (14) and an end fitting (24) which is molded over the end of the conduit, preventing axial movement between the end fitting and the conduit.

6 Claims, 1 Drawing Sheet

5,337,621

CABLE END FITTING RETAINER AND METHOD FOR MAKING SAME

TECHNICAL FIELD

The subject invention relates to motion transmitting remote control cable assemblies of the type for transmitting motion in a curved path, and more particularly to cable end fittings and methods for securing end fittings on cables.

BACKGROUND OF THE INVENTION

Remote control cables often include end fittings secured onto the end of a conduit. Skilled practitioners have devised various ways of securing an end fitting on a conduit.

U.S. Pat. No. 5,199,320 to Spease et al. teaches an end fitting comprising two eyelets which telescopingly engage one another and, in a sense, clamp onto the wires extending from the jacket. This end fitting is secure once placed on the conduit; however, placing the end fitting on the conduit involves manually feeding the wires through the eyelets of the end fitting. This process may involve some difficulty and unnecessary cost.

U.S. Pat. No. 3,263,519 to Conrad and U.S. Pat. No. 3,263,520 to Tschanz teach a method for molding a plastic end fitting to the plastic jacket of a conduit. Because plastic molds onto plastic at high temperatures, the plastic end fitting will thermally bond onto the plastic jacket. This bond will resist separation of the end fitting from the conduit. These patents also teach flaring the ends of the lay wires in the conduit in order to provide a mechanical lock between the conduit and the end fitting which is molded over the flaring on the wires. In other words, flaring the ends of the wires anchors the end fitting on the conduit. The mechanical lock or anchor further resists relative movement between the end fitting and the conduit. Flaring the ends of the wires is simple and inexpensive, but some applications require that the mechanical lock between end fitting and conduit be greater than is possible with the end-flaring technique.

Thus, current applications require a simple and inexpensive technique for mechanically locking the end fitting to the conduit, where in some cases the strength of the mechanical lock must be greater than may be acheived by the end-flaring technique.

SUMMARY OF THE INVENTION AND ADVANTAGES

A motion transmitting remote control cable assembly for transmitting motion in a curved path comprises: a flexible motion transmitting core element; and a conduit slideably supporting the core element. The conduit includes: a jacket extending between first and second ends defining an inner bore and an outer surface; and a liner lining the inner bore, where the liner includes a projecting end projecting beyond at least one of the ends of the jacket. The conduit further includes at least one wire extending axially through the conduit outside the liner, the wire including a projecting end projecting together with the liner beyond the one end of the jacket. The projecting end of the wire includes a diverging portion diverging away from the liner. An end fitting is disposed over the projecting ends of the wire, the projecting end of the liner and the jacket. The assembly is characterized by the projecting end of the wire including a converging portion extending from the diverging portion back toward the liner, the converging portion and the diverging portion together defining an arch-shaped radial protrusion protruding from the liner whereby the projecting end of the wire resists axial movement of the conduit with respect to the end fitting.

A corresponding method for placing an end fitting on the conduit of a motion transmitting remote control cable, where the cable includes an outer jacket defining an inner bore, a liner lining the inner bore and a plurality of lay wires extending axially through the conduit outside the liner, includes the steps of: exposing the liner and the lay wires at one end of the conduit; deforming the ends of the lay wires; and molding an end fitting over the jacket, the liner and the deformed ends of the lay wires whereby the deformed lay wires provide a mechanical lock to retain the end fitting on the conduit. The method is characterized by deforming the ends of the lay wires by applying an axial force along the outer surface of the liner to the ends of the wires and thereby arching them out with respect to the liner.

Thus, the end fitting can be molded onto the conduit in a simple and inexpensive way. Moreover, the arch shape on the end of the wire provides more resistance to axial movement of the end fitting than the simple flaring taught in the prior art. This is because the arch provides, in a sense, two surfaces which resist axial movement of the end fitting in a given axial direction; whereas, the flaring on the end of the wire provides only one surface resisting movement of the end fitting in a given axial direction.

FIGURES IN THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
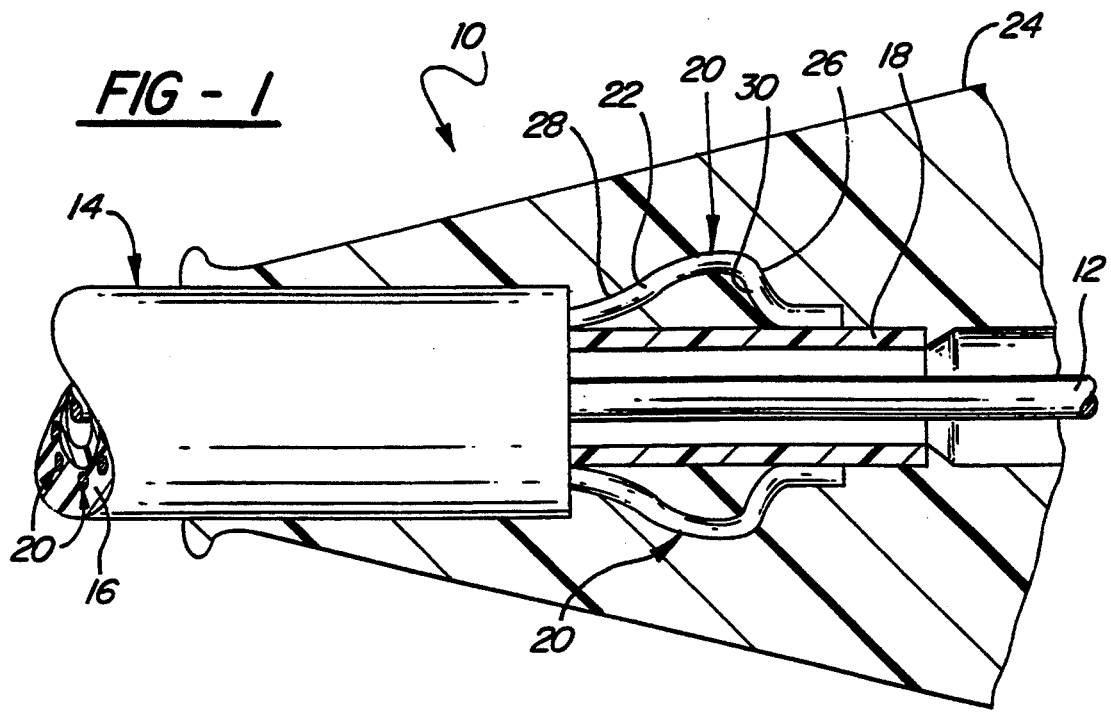
FIG. 1 is a side view of the conduit having the end fitting molded thereon, and partially in section to show the arching of the conduit wires.
Figure 2:
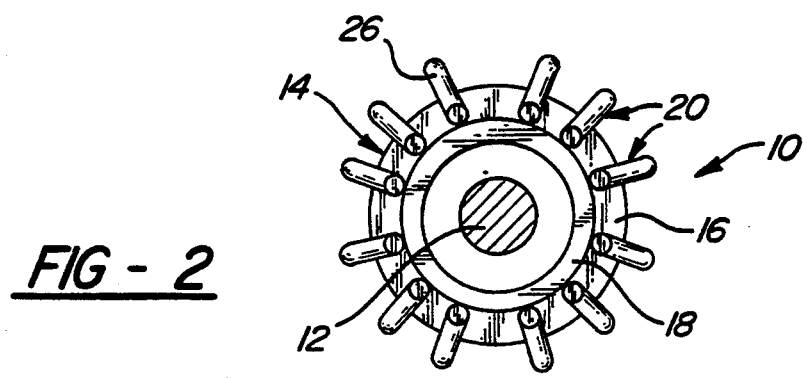
FIG. 2 is an end view of the conduit with the end fitting removed.

Referring to the Figures wherein like numerals indicate like or corresponding parts throughout the several views, a remote control cable assembly is generally shown at 10.

The cable assembly 10 includes a flexible motion transmitting core element 12 and a conduit generally indicated at 14 slideably supporting the core element. The conduit 14 includes a jacket 16 extending between first and second ends defining an inner bore and an outer surface. A liner 18 lines the inner bore and includes a projecting end projecting beyond at least one of the ends of the jacket 16. At least one wire generally indicated at 20 extends axially through the conduit 14 outside the liner 18 and includes a projecting end projecting together with the liner beyond the one end of the jacket 16. The projecting end of the wire 20 includes a diverging portion 22 diverging away from the liner 18. An end fitting 24 is disposed over the projecting end of the wire 20, the projecting end of the liner 18 and the jacket 16. The assembly 10 is characterized by the projecting end of the wire 20 including a converging portion 26 extending from the diverging portion 22 back toward the liner 18, where the converging portion 26 and the diverging portion 22 together define an arch-shaped radial protrusion protruding from the liner 18 whereby the projecting end of the wire 20 resists axial movement of the conduit 14 with respect to the end fitting 24.

The arching, bowing, ballooning or "bird caging" of the protruding end of the wire 20 provides a stronger mechanical lock between the conduit 14 and the end fitting 24 than if the protruding end of the wire were straight or even flared. By flaring the end of the wire 20, one creates a surface 28 on the wire which resists axial movement of the end fitting 24 and thereby provides a mechanical lock. By including the additional curve 26 in the protruding end of the wire 20, i.e. so that the wire converges back toward the surface of the liner 18 and thereby defines the arch shape, one creates an additional surface 30 which will resist axial movement of the end fitting 24 with respect to the conduit 14. To describe the shape of the protruding end of the wire 20 in yet another way, one can say that the wire diverges from the liner 18 and then converges with the liner again farther in the axial direction along the liner away from the end of the jacket 16.

The conduit 14 actually includes a plurality of wires 20, i.e. more than one, with each having the arch-shaped protrusion 22,26 protruding radially from the protruding end of the liner 18 and being embedded in the end fitting 24. The term "bird-caging" is used in the art to describe the appearance of the end of the conduit 14 after the wires 20 have been shaped in the desired manner. This is obviously because the ends of the wires 20 form a bird cage shape. By adding more wires 20, one can generally increase the strength of the mechanical lock between the end fitting 24 and the conduit 14.

The jacket 16, the liner 18 and the end fitting 24 are all made from an organic polymeric material, i.e. plastic. In some cases the liner 18 is made from polytetraflouroethylene of the type sold under the trademark TEFLON. The wires 20 are made from metal. The conduit 14 and its component parts, i.e. the liner 18, the jacket 16 and the wires 20 are old and well known in the art. Nothing new is taught here regarding the manufacture of the conduit 14 other than with respect to the forming technique for forming the ends of the wires 20 to recieve and retain the end fitting 24.

The protruding ends of the wires 20 can be arched or bowed, etc. according to various methods. There is disclosed here a preferred method for placing an end fitting 24 on the conduit 14 of a motion transmitting remote control cable where the cable includes an outer jacket 16 defining an inner bore, a liner 18 lining the inner bore and a plurality of lay wires 20 extending axially through the conduit 14 outside the liner. The method includes the steps of exposing the liner 18 and the lay wires 20 at one end of the conduit 14; deforming the ends of the lay wires 20; and molding an end fitting 24 over the jacket 16, the liner 18 and the deformed ends of the lay wires 20 whereby the deformed lay wires provide a mechanical lock to retain the end fitting 24 on the conduit 14. The method is characterized by deforming the ends of the lay wires 20 by applying an axial force along the outer surface of the liner 18 to the ends of the wires 20 and thereby arching them out with respect to the liner.

The method further includes the steps of surrounding the liner 18 with an annular flange, moving the flange axially along the liner, abutting the ends of the lay wires 20 and arching the lay wires out with respect to the liner.

The method further includes the step of supporting the walls of the liner 18 while the wires 20 are being arched. This is achieved by inserting a pin 32 in the liner 18 to support the walls of the liner while the wires 20 are being arched.

Figure 3:
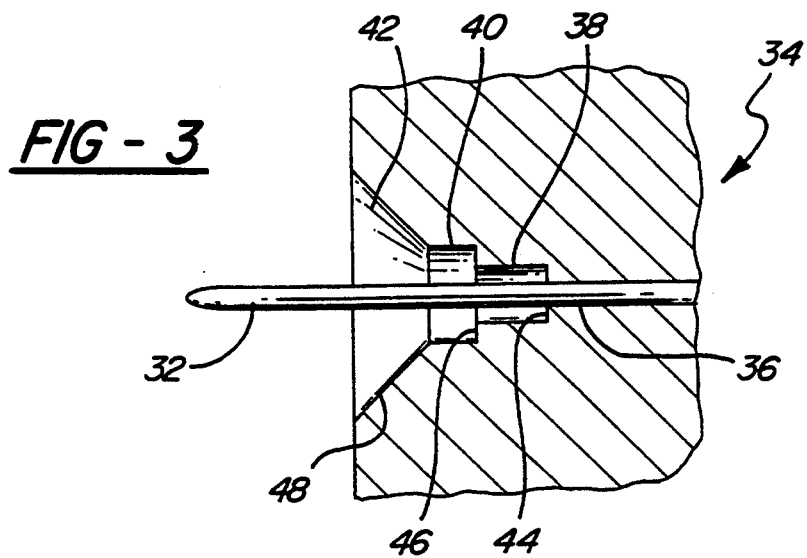
FIG. 3 is a side section view of a die used for forming the arching in the ends of the conduit wires.

The subject method contemplates the use of a particular die as generally shown at 34 in FIG. 3 whereby the arching of the ends of the wires 20 may be accomplished simply by forcing the end of the conduit 14 into the die.

The die 34 is a solid block of material, typically metal, and includes through one surface a bore 36, a first counterbore 38, a second counterbore 40 and a third counterbore 42. In other words, the die 34 includes four concentric holes 36, 38, 40, 42 which increase in diameter as they become shallower with respect to the surface of the die. These holes 36,38,40,42 may be formed in alternative ways, of course. A support pin 32 fits snugly into the bore 36. The first counterbore 38 defines an annular liner seating surface 44. The diameter of the first counterbore 38 is slightly greater than the outer diameter of the liner 18 so that the liner fits snugly into the first counterbore. The second counterbore 40 defines a wire seating surface 46. The third counterbore 42 defines a frustuconical surface 48.

In operation, the end of the conduit 14 is inserted into the die 34 so that the pin 32 fits into and supports the liner 18. As the projecting end of the liner 18 moves toward the liner seat 44, the projecting ends of the wires 20 will abut the wire seat 46. As the projecting end of the liner 18 moves further toward the liner seat 44, the wires 20 will be bent, or arched, or bowed. This bowing will stop when the liner 18 finally seats against the liner seat 44. As the wires 20 are bending they will recieve support from the frustuconical surface 48.

At this point the wires 20 have been formed to arch or "birdcage" at their ends and the conduit 14 is ready to have the end fitting 24 molded over the jacket 16, the liner 18 and the arched wires 20.

The end fitting 24 is molded onto the end of the conduit 14 over the liner 18 and the arched ends of the wires 20 by means of injecting a thermoplastic into a mold (not shown) which is disposed around the end of the conduit 14. This molding is old and well known in the art. Nothing new is taught here other than regarding the forming of the ends of the wires 20 to recieve and retain the end fitting 24.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. A motion transmitting remote control cable assembly (10) for transmitting motion in a curved path comprising:

a flexible motion transmitting core element (12);

a conduit (14) slideably supporting said core element (12), said conduit including:

a jacket (16) extending between first and second ends defining an inner bore and an outer surface;

a liner (18) lining said inner bore, said liner including a projecting end projecting beyond at least one of said ends of said jacket (16);

at least one wire (20) extending axially through said conduit (14) outside said liner (18), said wire including a projecting end projecting together with said liner beyond said one end of said jacket (16);

said projecting end of said wire (20) including a diverging portion (22) diverging away from said liner (18);

an end fitting (24) disposed over said projecting end of said wire (20), said projecting end of said liner (18) and said jacket (16);

characterized by said projecting end of said wire (20) including a converging portion (26) extending from said diverging portion (22) back toward said liner (18), said converging portion (26) and said diverging portion (22) together defining an arch-shaped radial protrusion (22,26) protruding from said liner whereby said projecting end of said wire (20) resists axial movement of said conduit (14) with respect to said end fitting (24).

2. An assembly (10) as set forth in claim 1 further characterized by said at least one wire (20) being a plurality of wires each including an arch-shaped protrusion (22,26) protruding radially from said protruding end of said liner (18) and being embedded in said end fitting (24).

3. An assembly (10) as set forth in claim 1 further characterized by said jacket (16) being made from an organic polymeric material.

4. An assembly (10) as set forth in claim 1 further characterized by said end fitting (24) being made from organic polymeric material.

5. An assembly (10) as set forth in claim 1 further characterized by said liner (18) being made from organic polymeric material.

6. An assembly (10) as set forth in claim 2 further characterized by said wires (20) being made from metal.

* * * * *